United States Patent
Lutz et al.

(10) Patent No.: US 7,030,987 B2
(45) Date of Patent: Apr. 18, 2006

(54) COLORIMETER WITH HIGH SNR

(75) Inventors: Carl David Lutz, Auburn, NH (US); Thomas A. Lianza, Bedford, NH (US)

(73) Assignee: Gretagmacbeth, LLC, New Windsor, NY (US)

( * ) Notice: Subject to any disclaimer, the term of this patent is extended or adjusted under 35 U.S.C. 154(b) by 336 days.

(21) Appl. No.: 10/684,864

(22) Filed: Oct. 14, 2003

(65) Prior Publication Data
US 2004/0114144 A1 Jun. 17, 2004

Related U.S. Application Data

(60) Provisional application No. 60/432,203, filed on Dec. 11, 2002.

(51) Int. Cl.
*G01N 21/25* (2006.01)

(52) U.S. Cl. .................... 356/419; 356/405; 356/416

(58) Field of Classification Search ............... 356/419, 356/405
See application file for complete search history.

(56) References Cited

U.S. PATENT DOCUMENTS

| | | | |
|---|---|---|---|
| 3,490,849 A | 1/1970 | Hambleton | |
| 3,880,523 A | 4/1975 | Thomas | |
| 4,134,683 A * | 1/1979 | Goetz et al. ................ | 356/407 |
| 4,995,727 A | 2/1991 | Kawagoe et al. | |
| 5,168,320 A | 12/1992 | Lutz et al. | |
| 5,257,097 A | 10/1993 | Pineau et al. | |
| 5,363,318 A | 11/1994 | McCauley | |
| 5,739,809 A | 4/1998 | McLaughlin et al. | |
| 5,739,914 A | 4/1998 | Chida et al. | |
| 5,892,585 A | 4/1999 | Lianza et al. | |
| 6,031,617 A | 2/2000 | Berg et al. | |
| 6,163,377 A * | 12/2000 | Boles et al. ................ | 356/402 |
| 6,226,034 B1 | 5/2001 | Katayama | |
| 6,320,652 B1 | 11/2001 | Morimoto et al. | |
| 6,445,451 B1 | 9/2002 | Douglas-Hamilton et al. | |
| 6,459,485 B1 | 10/2002 | Tsurutani | |
| 6,512,223 B1 * | 1/2003 | Wynn ........................ | 250/239 |
| 6,816,262 B1 * | 11/2004 | Slocum et al. ............... | 356/416 |
| 2002/0159065 A1 | 10/2002 | Berstis | |
| 2002/0159066 A1 | 10/2002 | Berstis | |
| 2003/0058202 A1 | 3/2003 | Evanicky et al. | |
| 2003/0058448 A1 | 3/2003 | Merle et al. | |

OTHER PUBLICATIONS

"TSL250, TSL251, TSL252 Light-To-Voltage Optical Sensors", SOE004C, Aug. 1991, Rev. Nov. 1995, pp. 1-6, Texas Instruments, Inc., Dallas, Texas.

(Continued)

*Primary Examiner*—Gregory J. Toatley, Jr.
*Assistant Examiner*—Roy M. Punnoose
(74) *Attorney, Agent, or Firm*—Maine & Asmus (57) ABSTRACT

A colorimeter device and fabrication techniques are disclosed. The assembly and configuration of the device operates to maximize signal-to-noise ratio, as well as to provide an optimal field of view (e.g., such as an FOV that simulates that of the human eye). Geometric elements and features of the design, in conjunction with the assembly procedure, assure precise alignment of optical elements including sensors, filters, and other elements within the enclosure and optical path.

19 Claims, 7 Drawing Sheets

OTHER PUBLICATIONS

"TSL235 Light-To-Frequency Converter", SEOS012, Sep. 1994, pp. 1-6, Texas Instruments, Inc., Dallas, Texas.

"NEC-Mitsubishi Electronics Display Enhances Award-Winning Line of CRT Monitors For Color Performance Users", http://www.necus.com/companies/17Enhance_13 crt_color_ users.htm, Nov. 12, 2001, pp. 1-3.

"Monacooptix With "Light Tunnel" Technology For Accurate LCD and CRT Display Profiling Now Available", http:www.monacosys.com/pressreleases/Optix10pr.html, Oct. 31, 2002, p. 1.

"MonacoOPTIX: Precision Calibration for LCD and CRT Displays", 2002, Monaco Systems, Andover, MA.

"Spectrolino Spectrophotometer: The Handheld System That Scores High In Color Measurement Precision", Mar., 1998, pp. 1-4, Gertag Macbeth, Regendorf, CH.

"Spyder:Professional Quality On-Screen Color", 2003, pp. 1-6. Color Vision Lawerenceville, NJ.

Some claimed embodiments of the present invention may have been offered for sale, but not more than one year before the filing date of U.S. Appl. No. 60/432,203.

PCT International Search Report, mailing date Jan. 26, 2005 for International Application No. PCT.US03/32831.

* cited by examiner

COLORIMETER WITH HIGH SNR

RELATED APPLICATIONS

This application claims the benefit of U.S. Provisional Application No. 60/432,203 filed 11 Dec. 2002, which is herein incorporated in its entirety by reference. In addition, this application is related to U.S. Pat. No. 6,880,790 and to U.S. application Ser. No. 10/684,854, filed Oct. 14, 2003, titled "Colorimeter with Single Cable Low Impact Mounting System". Each of these applications is herein incorporated in its entirety by reference.

FIELD OF THE INVENTION

The invention relates to calorimeters, and more particularly, to a calorimeter with optical geometry and assembly that provides high a signal-to-noise ratio (SNR).

BACKGROUND OF THE INVENTION

Colorimeters are accurate devices for measuring the spectral content of light emitted either directly or indirectly from a given source. Standards bodies such as the Video Electronics Standards Association (VESA) have been a driving force behind the development of colorimeter performance. The VESA 1.0 standard, for example, is primarily directed to specifying measurement of contrast ratio, and is limited to a no greater than +/−2 degree viewing angle from the source to the sensor.

However, typical devices being measured, such as computer displays, are actually viewed from much greater angles than specified in the standards. To further exacerbate this situation, the degradation of spectral parameters that occurs with increased viewing angle, does not occur equally for all colors. Such incompatibilities have yet to be resolved or otherwise addressed. In addition, early devices developed under the standards were relatively costly. Such devices typically employ highly accurate measurement optics. Apertures have frequently been used in conjunction with lenses or other precision optical elements. Typical colorimeter configurations include a light sensing diode, and an integral lens that directs light to the sensor area.

More recent developments have produced designs resulting in low cost calorimeters with performance characteristics approaching or exceeding professional quality required by the standards. Such newer designs generally employ basic aperture geometry, and either non-overlapping or overlapping spectral ranges/filters. One such design uses a unique aperture plate that has oblong holes, and is spaced between the target surface and the filter/sensor set. The resulting field of view is about +/−15 degrees or more on each axis.

However, such a design does not correspond to the field of view of the human eye. Rather, it is about four times too large. Also, the position of the aperture plate is spaced from the target surface by a mounting distance that is typically defined by one to four (i.e., one at each corner of the colorimeter housing) relatively large suction cups. Such designs generally cause variations in the mounting distance due to leaking-based relaxation of the suction cups.

This variation, in conjunction with a fixed-distance between the aperture plate and the sensor, causes the field of view to vary as well, and adversely impacts the accuracy of color measurements taken.

In addition, colorimeter designs generally require alignment of the sensor to one or more optical paths. This alignment is typically provided by a secondary reference surface on the sensor diode. However, this sensor reference does not assure accurate alignment of the sensor in the plane parallel to the measured surface, and there is no means for locating the center of the senor lens to the center of the optical path. Such limitations contribute to undesirable decay of the SNR, as well as to inadequate color measurement accuracy.

What is needed, therefore, is an improved calorimeter design having optimal or otherwise increased SNR, and that has a field of view that corresponds to that of the human eye. In a more general sense, there is a need for a calorimeter design for accurately measuring color from the likes of displays, CRTs, LCDs, and printed or pictorial materials.

BRIEF SUMMARY OF THE INVENTION

One embodiment of the present invention provides a color sensing device for sensing light emitting from a target surface. The device includes a tube block having one or more filter cavities and corresponding light passages, as well as two or more alignment pins, thereby enabling a self-aligning fabrication process for the device. The device further includes one or more light sensors. Each sensor is configured with a bubble shaped lens and is adapted to detect light from the target surface. The device further includes a sensor locating element operatively coupled to the pins of the tube block. The sensor locating element has one or more lens alignment holes. Each hole is adapted to receive a corresponding one of the bubble shaped lenses, thereby aligning each sensor with a corresponding light passage of the tube block.

The device may further include one or more light filters. Each filter can be placed in a corresponding one of the filter cavities, thereby providing one or more spectrally selective channels. Each spectrally selective channel can be designed to provide a pre-defined field of view between the target surface and a corresponding one of the light sensors. In one such embodiment, the sensor locating element is further configured with one or more crushable ribs proximate each alignment hole, thereby enabling maximum clamping pressure on each filter with minimum deformation of filter elements. Note that the one or more spectrally selective channels can be configured as non-overlapping, overlapping, and/or to enable tri-stimulus measurements. Further note that the field of view between each sensor and the target surface can be set to simulate the field of view of the human eye.

In one such particular embodiment, each of the one or more light sensors has a planar locating surface that mates with a surface about a corresponding one of the alignment holes of the sensor locating element, thereby aligning a plane of the target surface and a plane of the sensors. In another such particular embodiment, each sensor has a surface that includes an inward dimple, and the device further includes a clamping block configured with one or more pressure bumps. Each pressure bump is adapted to engage a corresponding dimple, thereby further contributing to self-aligning qualities of the device. The device may further include a lead frame PCB assembly configured with soldering points for electrically connecting the sensors, and alignment holes adapted to couple with alignment pins of the tube block, thereby further contributing to self-aligning qualities of the device.

Another embodiment of the present invention provides a color sensing device for sensing light emitting from a target surface. The device includes three or more light sensors, where each sensor is configured with a bubble shaped lens and adapted to detect light from the target surface. The device further includes a sensor locating element having three or more light passages and corresponding alignment holes. Each hole is adapted to receive a corresponding one of the bubble shaped lenses, thereby aligning each sensor with a corresponding light passage. The device further includes a tube block operatively coupled in alignment with the sensor locating element. The tube block has three or more filter cavities and corresponding light passages, where each light passage is in alignment with a corresponding light passage of the sensor locating element. The device further includes three or more distinct light filter stacks including one or more filter elements. Each filter stack is placed in a corresponding one of the filter cavities, thereby providing three or more overlapping spectrally selective channels, with each spectrally selective channel designed to provide a pre-defined field of view between the target surface and a corresponding one of the light sensors.

In one such particular embodiment, each spectrally selective channel is designed to provide a field of view between each sensor and the target surface in the range of +/−5 to 7 degrees. The three or more light sensors may include, for example, three light-to-frequency sensors (e.g., detecting emitted colors) for characterizing the target surface. The three or more light sensors may also include a light-to-voltage sensor for characterizing the target surface (e.g., detecting refresh rate) without the use of filters (without the use of filters). The sensor locating element can be further configured with one or more crushable ribs proximate each alignment hole, thereby enabling maximum clamping pressure on each filter stack with minimum deformation of filter elements.

The device may also include a clamping block configured with three or more pressure bumps adapted to apply clamping pressure to the sensors during assembly of the device. During final assembly of one such embodiment, a clamping screw travels through at the clamping block and sensor locating element, and threads into a clamping screw hole in the tube block at a pre-defined torque. Each sensor can be configured with an inward dimple that is adapted to receive a corresponding pressure bump of the clamping block, thereby further contributing to self-aligning qualities of the device. The device may further include a sensor shield that is adapted to prevent extraneous light from corrupting measurement accuracy.

Another embodiment of the present invention provides a method for fabricating a color measurement device. The method includes providing a tube block having one or more filter cavities and corresponding light passages, and two or more alignment pins, thereby enabling a self-aligning fabrication process for the device. The method continues with placing each of one or more filter stacks in a corresponding one of the filter cavities, thereby enabling one or more spectrally selective channels. The method proceeds with placing a sensor locating element on the alignment pins of the tube block. The sensor locating element has one or more alignment holes each adapted to receive a bubble lens of a light sensor. The method continues with placing the one or more bubble lens light sensors on the sensor locating element, so that each bubble lens is received into a corresponding one of the alignment holes, thereby aligning each sensor with a corresponding light passage of the tube block.

The method may further include torquing a clamping screw into the tube block so as to secure components of the device and to crush one or more crushable ribs proximate each alignment hole, thereby enabling maximum clamping pressure on each filter stack with minimum deformation of filter elements using one or more. The method may further include mating a planar locating surface of each of the one or more light sensors with a surface about a corresponding one of the alignment holes of the sensor locating element, thereby aligning a plane of the target surface and a plane of the sensors.

The method may further include placing a lead frame PCB assembly configured with alignment holes on alignment pins of the tube block, thereby further contributing to self-aligning qualities of the device. In this particular case, the method may further include soldering leads of the sensors to contact points of the lead frame PCB assembly after torquing of a clamping screw has secured components of the device. Performing soldering at this point allows the self-aligning qualities of the device to operate during the pre-solder clamping process. In the case where each sensor has a surface that includes an inward dimple, the method may further continue with placing a clamping block configured with one or more pressure bumps on alignment pins of the tube block, so that each pressure bump engages a corresponding dimple, thereby further contributing to self-aligning qualities of the device.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

Note that the figures are presented to facilitate understanding and clarity of individual features, and are not necessarily drawn to scale.

DETAILED DESCRIPTION OF THE INVENTION

Embodiments of the present invention provide calorimeters capable of measurement of emitted light from sources that are static such as LCD displays, illuminated printed or graphic matter, and/or temporally active such as CRT displays or strobed printed and graphic matter. The assembly and configuration of the device operates to maximize signal-to-noise ratio (SNR), as well as to provide an optimal field of view that simulates the field of view of the human eye. Geometric elements and features of the device design, in conjunction with the assembly procedure, assure precise alignment of optical elements including sensors, filters, and other elements within the enclosure and optical path.

One particular embodiment of the device is configured with a viewing angle or field of view (FOV) in the range of +/−5 to 7 degrees. This FOV is near optimum for achieving the desired performance for the low cost calorimeter, and effectively matches the human eye field of view. A tube block element, which can be sized to fit into the existing products, has a number of light passage tubes, each tube having a diameter to tube length ratio that meets the +/−5 to 7 degree requirement to achieve the desired FOV. The tube block can be molded from a material that minimizes reflectance of the tube walls, thereby preserving the selected FOV.

In addition, the tube block is configured with guide pins and a number of filter stack cavities which allow for alignment of the sensors and their respective molded lenses to the center of the optical field. The device components, such as the sensors, filters, printed circuit board (PCB), molded tube block, housing, and other system elements can be assembled prior to soldering the sensors to the PCB. These self-aligning and pre-solder assembly qualities enable a significantly improved SNR relative to conventional devices e.g., four to five times higher).

Crushable ribs can be employed during assembly to provide a compliance that both preserves filter integrity, while simultaneously providing adequate clamping force to hold system elements in place. The device is not affected by mounting compliance or other variable factors. The design enables different filter sets to provide overlapping or non-overlapping spectrally selective channels. In operation, the calorimeter characterizes the measured target surface as the human eye would see it, including both the human eye's color response and field of view. In the case of a display screen, the device can be configured to detect the type of display. Thus, a low cost high accuracy colorimeter is provided.

Colorimeter Architecture

Figure 1:
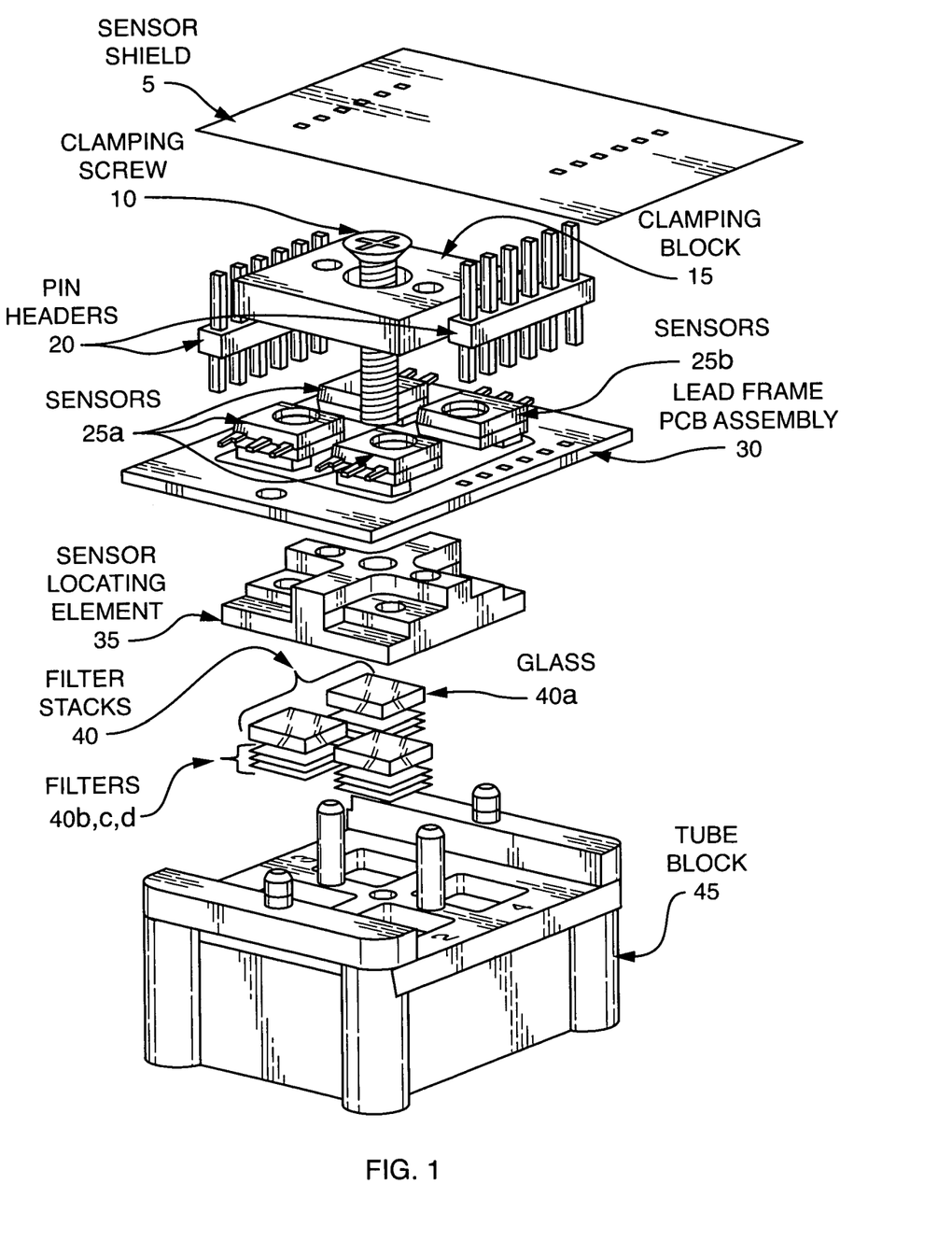
FIG. 1 is an exploded view of a calorimeter configured in accordance with one embodiment of the present invention.

FIG. 1 is an exploded view of a colorimeter assembly configured in accordance with one embodiment of the present invention. As can be seen, the assembly includes a sensor shield 5, a clamping screw 10, a clamping block 15, pin headers 20 and a corresponding PCB assembly 30, a number of sensors 25*a–b*, a sensor locating element 35, a number of filter stacks 40, and a tube block 45. Other components and features, such as a dust cover, cabling, and calorimeter circuitry, may also be included in the design as will be apparent in light of this disclosure.

The assembly procedure will be apparent from FIG. 1. Three filter stacks 40, each of which includes a glass layer 40*a* and three filter layers 40*b–d*, are placed in respective cavities of the tube block 45. Each cavity has a centrally located light passage that travels through the tube block 45 to allow intake of light from a target surface. The sensor locating element 35 is placed onto the tube block 45 via center guide pins to secure the filter stacks 40 in their cavities. The lead frame PCB assembly 30 is placed into position on the tube block 45 via a set of end guide pins. Three light-to-frequency sensors 25*a* and a light-to-voltage sensor 25*b* are placed in their respective positions, so that the lens of each sensor 25 is received into a lens alignment hole of the sensor locating element 35, thereby enabling filtered light to be received via the corresponding light passage. The clamping block 15 is placed over the sensors 25 via the guide pins of the tube block 45. The clamping screw 10 is torqued to secure the assembly. The sensor leads can then be soldered to the PCB assembly 30. Note that functional testing of the device can be performed before and/or after the soldering (assuming the unsoldered leads are in proper electrical contact). The sensor shield 5 can be installed over and/or around the clamping block 15 to prevent extraneous light from entering the back of the device, which reduces measurement accuracy. Also, a removable dust cover (not shown) can be coupled with the target surface side of the tube block 45 to protect the device until its use.

Each of the components and their respective features will now be discussed with reference to one of the more detailed FIGS. 2*a*–8*f*. The example dimensions are in inches. Note that specific details (e.g., component features, dimensions, sensor type and/or shape) illustrated in these figures are included to provide a robust disclosure, and a detailed example embodiment. It is not intended, however, that the present invention be limited to any one such embodiment or configuration. Rather, numerous such embodiments will be apparent in light of this disclosure.

Figures 8A, 8B, 8C, 8D, 8E, 8F:
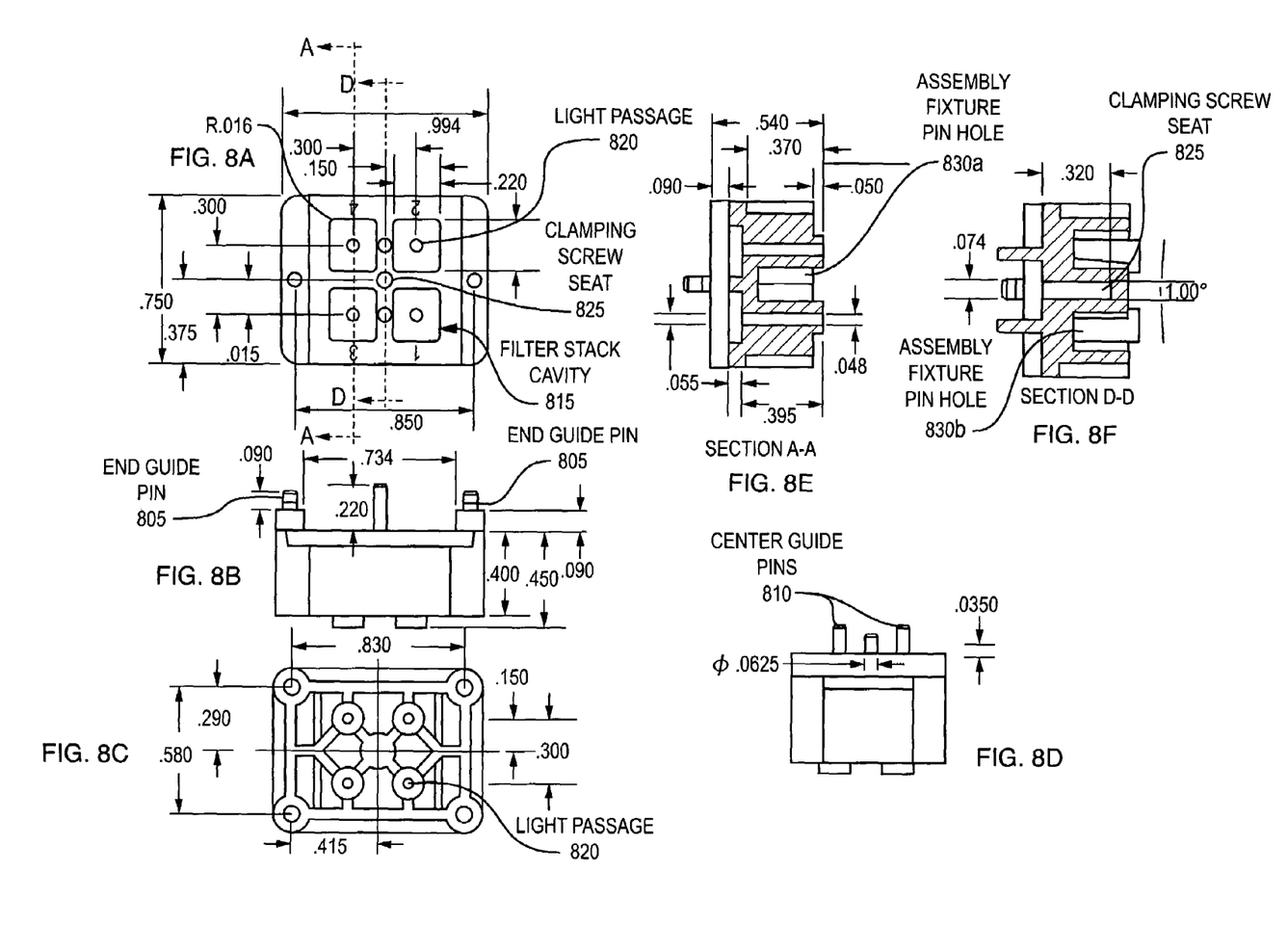
FIGS. 8a–f illustrate a tube block of the colorimeter shown in FIG. 1.

FIGS. 8*a*–*f* illustrate a tube block configured in accordance with one embodiment of the present invention. The tube block 45 can be a molded material having a low reflectance (e.g., black ABS/PC plastic), and effectively forms a base upon which the other componentry can be assembled. FIG. 8*a* illustrates a top view of the tube block. Note the four numbered filter stack cavities 815, and the light passage 820 in each cavity. The filter stack cavities 815 of tube block 45 are adapted to accommodate a variety of filter combinations within the filter stacks 40 to spectrally characterize each measurement channel.

Note that the embodiment shown in FIG. 1 has filter stacks 40 in three of the four cavities 815. The configuration provides three spectrally selective channels (overlapping or non-overlapping depending on filter layers 40*b–d*), and a fourth voltage sensing channel (by virtue of sensor 25*b*). Further note the tapered clamping screw seat 825, which is unthreaded until clamping screw 10 is torqued into place. Also shown in FIG. 8*a* are a pair of center guide pins (in vertical line with the clamping screw seat 825) and a pair of end guide pins (in horizontal line with the clamping screw seat 825).

FIG. 8*e* illustrates a cross-section of the tube block 45 taken at A—A, and further demonstrates the relationship between the filter stack cavities 815 and their corresponding light passages 820. Also shown is an assembly fixture pin hole 830*a*. FIG. 8*d* illustrates a cross-section of the tube block 45 taken at D—D, and shows the tapered nature of the clamping screw seat 825. Also shown is an assembly fixture pin hole 830*b*. The fixture pin holes 830 can be used to temporarily mount the tube block 45 onto the pins of a fixture during the assembly process.

FIG. 8*c* is a bottom view of the tube block, and further illustrates the assembly fixture pin holes 830*a* (in the horizontal plane) and 830*b* (in the vertical plane). Further note the four light passages 820 coming out the bottom of the tube block 45. This is the target surface side. The light passages 820 of tube block 45 each have an orifice diameter on the target surface side, and a length of each light passage 820 to the corresponding stack cavity 815 that is determined based on the orifice diameter to provide an optimal or otherwise desired field of view.

In the particular embodiment demonstrated in the figures, note that the diameter of the light passages 820 corresponding to the sensors 25*a* are set to achieve the desired FOV. The diameter of the light passage 820 corresponding to the sensor 25*b*, however, can be wider to ensure sufficient light is provided to sensor 25*b* to enable its proper function.

FIG. 8*b* illustrates a side view of the tube block. Here, the two end guide pins 805, and one of the center guide pins are shown. In this particular embodiment, note that the light passages 820 each extend from the bottom of the tube block 45 by about 0.05 inches. Such extensions can be used to provide a desired FOV and contact surface, while simultaneously allowing for a decrease in the amount of material required to fabricate the block 45. In alternative embodiments, the light passage openings are flush with the bottom of the tube block 45. FIG. 8d is an end view of the tube block 45, and further illustrates the center guide pins 810, as well as one of the end guide pins and two of the extended light passages.

Figure 6A:
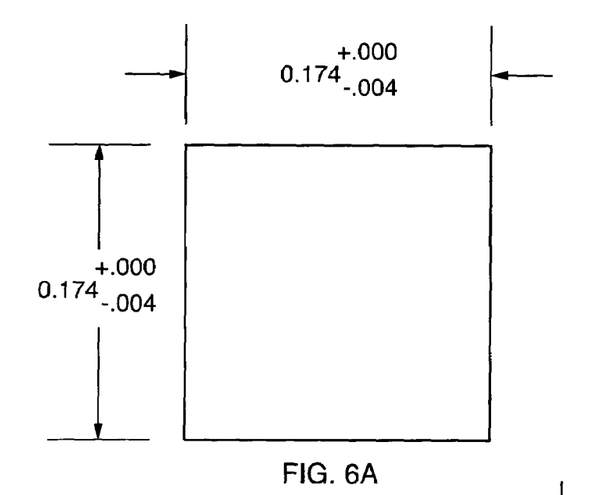
FIGS. 6a–b and 7a–b illustrate elements of a filter stack of the colorimeter shown in FIG. 1.
Figure 6B:
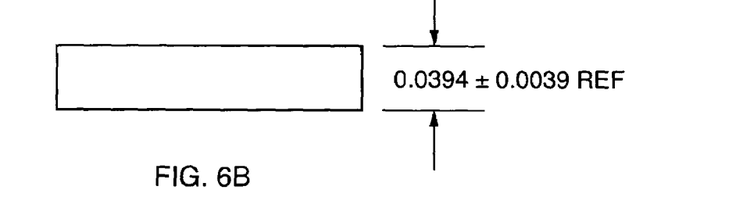
Figure 7A:
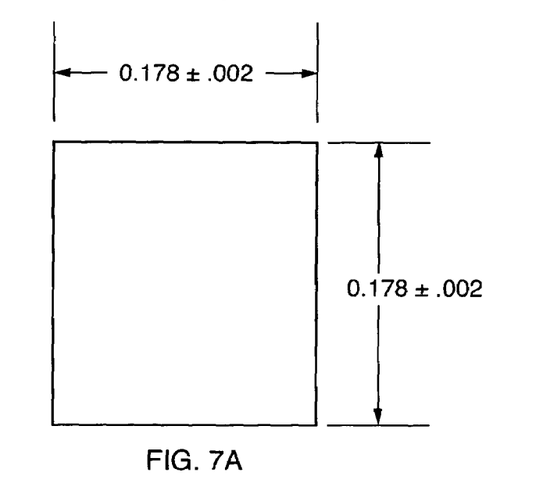
Figure 7B:
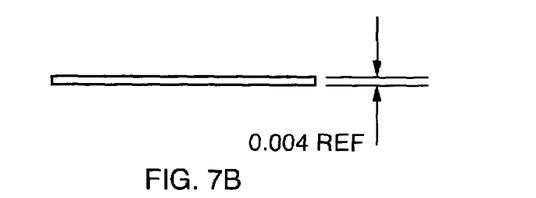

FIGS. 6a–b and 7a–b illustrate elements of the filter stacks 40 in accordance with one embodiment of the present invention. In particular, FIG. 6a is a top view of the glass layer 40a, while FIG. 6b is a side view. FIGS. 7a and 7b, on the other hand, provide top and side views, respectively, of the filter layers 40b–d. In general, the three filter stacks 40 are configured to pass a particular type of light (one or more colors). To that end, various filter combinations and filters can be employed from many different manufactures (e.g., Lee, Roscolux).

The glass layer 40a of each stack can be, for example, a polished piece of blue/green infrared rejection filter glass. In one particular embodiment, the stack filter layers 40b–d are as follows: cavity number one—layer 40b is a rose filter, layer 40c is a Moroccan pink filter, and layer 40d is a medium amber filter; cavity number two—layer 40b is a green filter, layer 40c is a straw filter, and layer 40d is a yellow filter; cavity number three—layer 40b is a mikkel blue filter, layer 40c is a slate blue filter, and layer 40d is a lily filter. Note that there is no filter stack in cavity number four for this particular embodiment. It will be appreciated that any number of filters and stacks can be employed here, depending on the particular application.

This particular combination of sensors 25a and respective filter stacks 40 provide non-overlapping spectral responses (via three separate and distinct spectrally selective channels). These responses are adequate for providing data capable of translation into a standard coordinates system, such as CIE XYZ, CIE L* a* b*, or CIE Luv, as well as non-standard operable coordinate systems. Tri-stimulus colorimetric measurements applications are one such example. The number of spectrally selective channels can be varied depending on the particular application.

In addition, other sensors types can be used to harvest other types of data, such as the light-to-voltage sensor 25b, which is used to determine voltage levels coming off of the target surface. Note that such a sensor does not operate in conjunction with a filter stack. Such optional sensors provide information that can be used to further characterize the object under test. In this particular embodiment, the light-to-voltage sensor 25b is used to detect the refresh or sweep rate of a CRT. Sweep rates can vary from one CRT to the next, and must be known to make accurate measurements based on information detected by the light-to-frequency sensors 25a.

Note that an LCD has a DC source, and wouldn't require such a sensor. However, by detecting no voltage variation (no sweep rate), it could be concluded that the colorimeter is mounted on an LCD. Further note that, in a colorimeter used with OEM equipment, such as a known computer display (e.g., LCD, CRT, flat panel) or end user software which detects type of display and provides CRT refresh rate, the sensor 25b would be optional. Other information that could be determined from the sensor 25b includes, for example, diagnostic voltage profile information of the display under test.

Figures 5A, 5B, 5C, 5D, 5E, 5F:
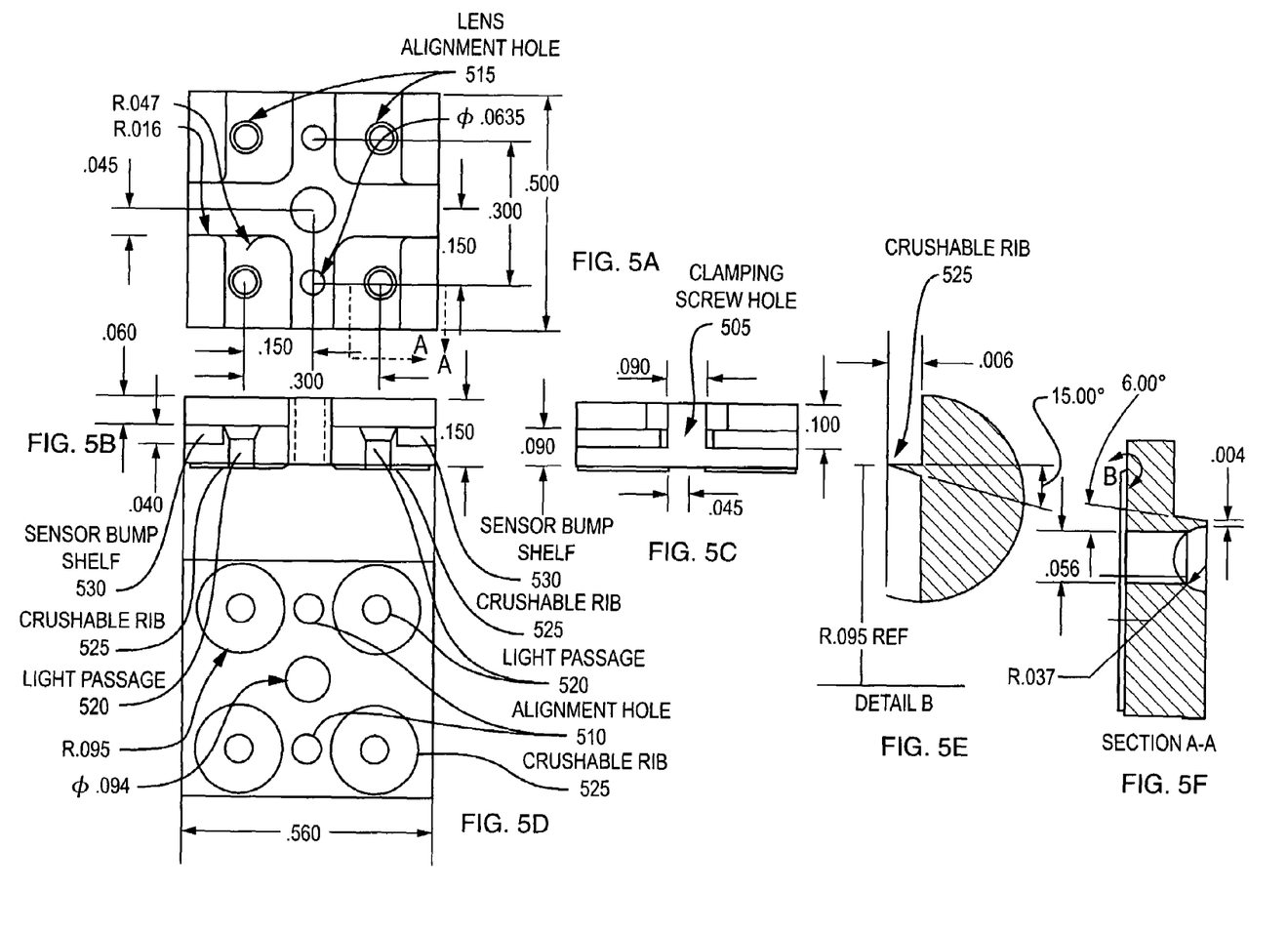
FIGS. 5a–f illustrate a sensor locating element of the colorimeter shown in FIG. 1.

FIGS. 5a–f illustrate a sensor locating element in accordance with one embodiment of the present invention. In particular, FIG. 5a is a top view of the sensor locating element 35, and shows the lens alignment holes 515 for each light passage. Note that each lens alignment hole 515 is shaped so as to snugly receive the lens of the sensors 25. Also shown are the centered clamping screw hole 505, and two guide pin alignment holes located on a vertical line with the clamping screw hole. These guide pin alignment holes correspond to the center guide pins 810 of the tube block 45. This guide pin/alignment hole scheme enables a self-aligning fabrication process.

FIGS. 5b and 5c are side views of the sensor locating element 35, and further detail the shape of the lens alignment holes 515, light passages 520, and clamping screw hole 505. Also shown are the crushable ribs 525 and the sensor bump shelves 530. The sensor bump shelves 530 will be best understood after viewing FIGS. 4a–d, which illustrate a sensor configured in accordance with one embodiment of the present invention. As can be seen, the sensor includes a sensor lens 410, a planar locating surface 415, and a bump 420.

These particular sensor features are part of the manufacturer's design, and are accommodated by the designated features of the sensor locating element 35. In one particular embodiment, sensors 25a are each a Texas Instruments TSL235 light-to-frequency converter, and sensor 25b is a Texas Instruments TSL250R light-to-voltage converter. These components have the same packaging as shown in FIGS. 4a–d. It will be appreciated in light of this disclosure that other sensors types, shapes, and configurations can be used here as well.

In this particular embodiment, each of the four sensors has a bubble lens 410 that is snugly received into a corresponding sensor alignment hole 515. Also, the planar locating surface 415 of each sensor 25 is placed flush on the planar area about the sensor alignment hole 515 of the sensor locating element 35, thereby aligning a plane of the target surface and a plane of the sensors. In addition, the bump 420 of each sensor is accommodated by the corresponding sensor bump shelf 530. Thus, the sensor locating element 35 can be customized so as to accommodate any number of sensor components and packaging schemes. In addition, note that "bubble lens" or "bubble shaped lens" are intended to cover numerous protruding lens shapes, such as rounded, oval, square, triangular, rectangular, tube-like, or any shape that can contribute to a self-aligning fabrication process.

FIG. 5d is a bottom view of the sensor locating element 35, and shows the clamping screw hole 505, alignment holes 510, and the light passages 520. In addition, further details of the crushable ribs 525 are shown FIG. 5d, as well as in FIGS. 5e and 5f. In this case, the crushable ribs 525 are formed as a thin ring extending from the bottom of the sensor locating element 35 about each light passage 520. Once the calorimeter is assembled, the clamping screw 10 can be tightened, thereby causing the crushable ribs 525 to deform against their respective filter stacks 40. Thus, an acceptable degree of force is applied to the stack to ensure its positional stability, without damaging the elements of the stack.

Other embodiments may have different crushable ribs 525, such as a plurality of crushable dots or ridges that extend from the bottom of the sensor locating element 35 proximate each light passage 520. Alternatively, the crushable ribs 525a can be in the form of dashed lines or a semi-circle. Regardless of their shape, the crushable ribs 525 can be molded or otherwise formed as an integral part of the sensor locating element 35. The crushable ribs 525 mate with the glass layer 40a of each stack, and are of a determined compliance so as to accomplish sufficient clamping pressure without deforming the filter stack.

Figure 3A:
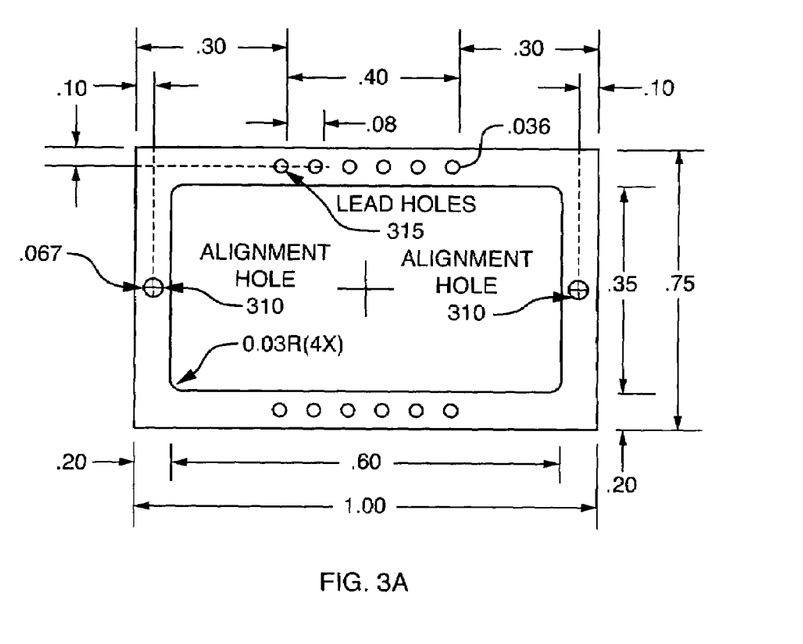
FIGS. 3a–b illustrate a lead frame PCB assembly of the colorimeter shown in FIG. 1.
Figure 3B:
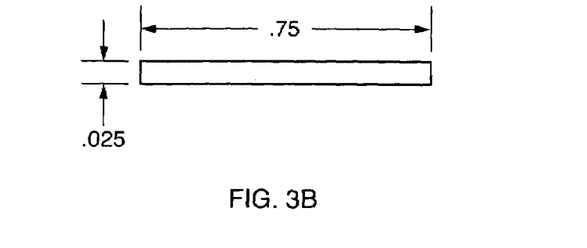
Figure 4A:
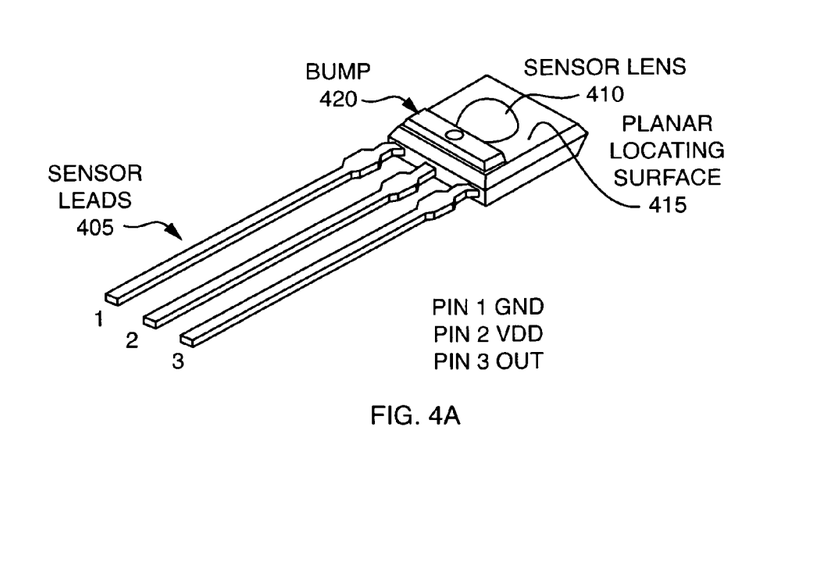
FIGS. 4a–d illustrate a sensor of the calorimeter shown in FIG. 1.
Figure 4B:
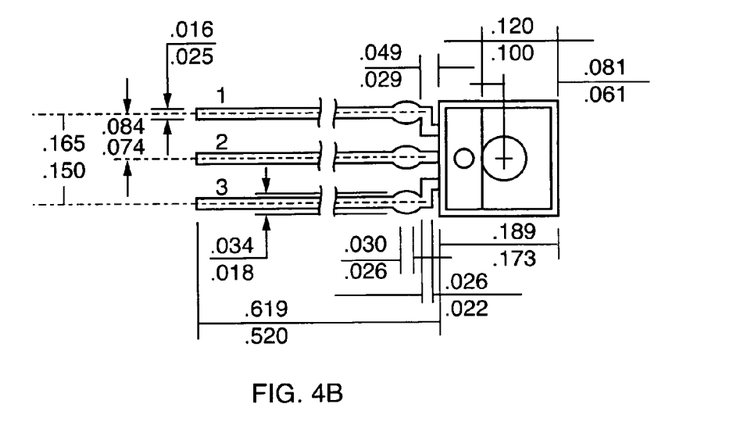
Figure 4C:
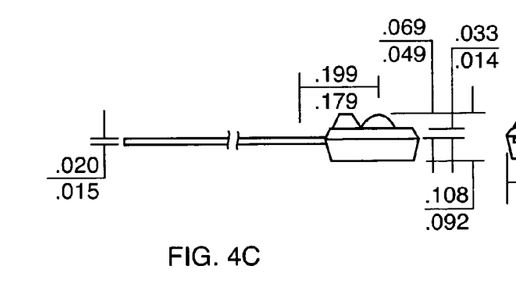
Figure 4D:
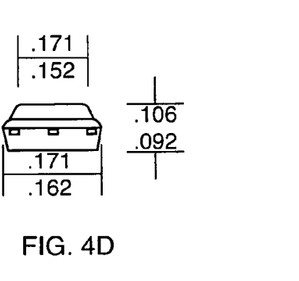

FIGS. 3a–b illustrate a lead frame PCB assembly 30 in accordance with one embodiment of the present invention. As can be seen, the PCB assembly 30 has a pair of guide pin alignment holes 310 and a number of lead holes 315. This further contributes to the self-aligning aspects achieved the fabrication process of the device. The alignment holes 310 are adapted to receive the end guide pins 805 of the tube block 45. The lead holes 315 are adapted to receive pin headers 20, which can be used to mate the overall assembly to a main assembly.

In addition, the PCB assembly 30 can include a PCB circuit layout having conductor runs and contact points to support the calorimeter circuitry and related electronics (e.g., components, wirebonds, and cabling). Thus, the PCB assembly 30 can have various circuit patterns and configurations. Factors such as the number of lead holes 315 and whether the lead holes 315 are plated through will depend on the particular application and PCB layout. In general, the lead frame PCB assembly 30 is designed so that it provides soldering points for electrically connecting the sensors 25a–b to the device electronics.

Figure 2A:
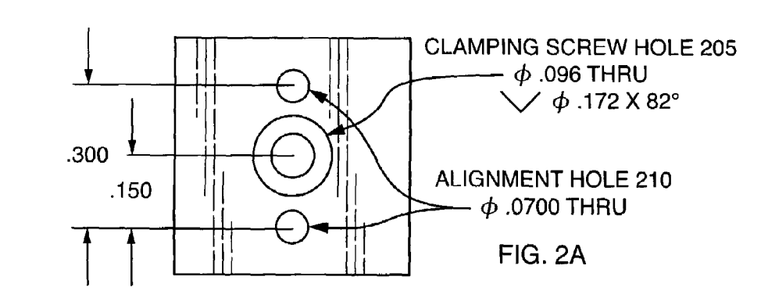
FIGS. 2a–d illustrate a clamping block of the colorimeter shown in FIG. 1.

FIGS. 2a–d illustrate a clamping block configured in accordance with one embodiment of the present invention. In particular, FIG. 2a shows a top view of the clamping block 15. As can be seen, the clamping block includes two guide pin alignment holes 210 and a clamping screw hole 205. The alignment holes 210 correspond to the center guide pins 810 of the tube block 45, to further support the self-aligning qualities of the device. The clamping screw hole 205 is counter-sunk and is adapted to receive the clamping screw 10.

Figures 2B, 2C:
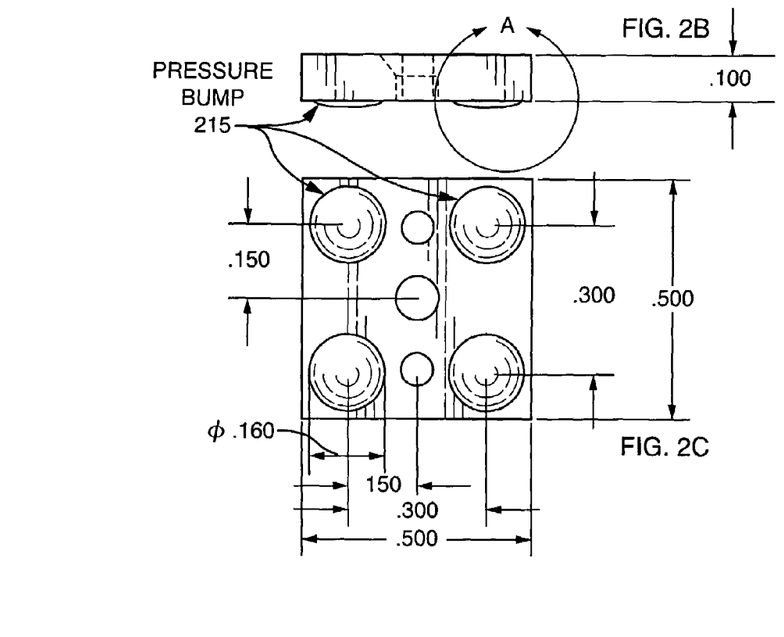
Figure 2D:
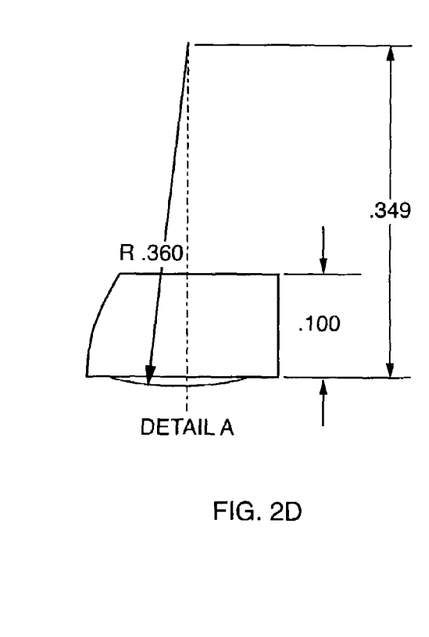

FIG. 2b is a side view of the clamping block 15, and shows the counter-sunk nature of the clamping screw hole 205, and further shows pressure bumps 215. FIG. 2d is a detail side view of the pressure bumps 215. FIG. 2c is a bottom view of the clamping block 15, and shows additional details of the pressure bumps 215, of which there are four in this particular embodiment. The pressure bumps 215 are adapted to apply clamping pressure to the back of the sensors 25 when the clamping screw 10 is torqued or otherwise tightened in place.

In one particular embodiment, the back of each sensor 25 includes an inward dimple that is adapted to receive a corresponding pressure bump 215. As the clamping screw is tightened, each sensor floats until the corresponding pressure bump engages, aligns (by operation of the bump/dimple combination), and secures the sensor 25 in place. After the clamping operation (e.g., torquing screw 10 into position), the sensor 25 leads can be soldered to the lead frame PCB assembly 30.

Once the clamping process is complete, the sensor shield 5 can be added over the clamping block 15 and about the assembly to prevent extraneous light (light that is from sources other than the intended source) from entering the light passages on the target surface side of the tube block. In one embodiment, the sensor shield is implemented with black electrical tape (e.g., 1½ inch wide, 8.5 mils thick, such as 3M Super 88 Etape). Variations on the shield will be apparent in light of this disclosure, such as a black rubber boot or other material that can shield extraneous light from the sensors 25. As previously explained, a dust cover can be fit over the target surface side of the tube block to block entry of dust and other contaminants into the sensor 25 area.

Note that the clamping block 15 and the sensor locating element 35 can be fabricated in a similar fashion as the tube block 45 (e.g., a molded material having a low reflectance, such as black ABS/PC plastic). Further note that the overall assembly can be mated to a primary PCB which contains all ancillary circuits to accomplish colorimeter functions, such as spectral measurement, spectral translations to standard coordinate systems, integration of samples, determination of display type, timing, and other required functionality.

The principles of the present invention can be employed by any colorimeter or similar sensing device. One such colorimeter design is described in detail in U.S. Pat. No. 5,892,585, which is herein incorporated by reference in its entirety. Note that a number of software and firmware routines can be used to achieve optimum colorimeter performance. Example software, firmware, and circuit functions are also described in the U.S. Pat. No. 5,892,585. Generally, a calorimeter is designed to simulate the color response of a human eye. An RGB result is calculated based on the colorimeter channel outputs (e.g., X, Y, and Z).

In addition, mounting techniques can be employed to further improve the device performance, such as the mounting techniques described in U.S. Pat. No. 6,880,790, and in U.S. application Ser. No. 10/684,854, filed Oct. 14, 2003, titled "Colorimeter with Single Cable Low Impact Mounting System".

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A color sensing device for sensing light emitting from a target surface, the device comprising:
    three or more light sensors, each sensor configured with a bubble shaped lens and adapted to detect light from the target surface;
    a sensor locating element having three or more light passages and corresponding alignment holes, each hole adapted to receive a corresponding one of the bubble shaped lenses, thereby aligning each sensor with a corresponding light passage;
    a tube block operatively coupled in alignment with the sensor locating element, the tube block having three or more filter cavities and corresponding light passages, each light passage in alignment with a corresponding light passage of the sensor locating element; and
    three or more distinct light filter stacks including one or more filter elements, each filter stack placed in a corresponding one of the filter cavities, thereby providing three or more overlapping spectrally selective channels, with each spectrally selective channel designed to provide a pre-defined field of view between the target surface and a corresponding one of the light sensors.

2. The device of claim 1 wherein each spectrally selective channel is designed to provide a field of view between each sensor and the target surface in the range of +/−5 to 7 degrees.

3. The device of claim 1 wherein the three or more light sensors include three light-to-frequency sensors for characterizing the target surface.

4. The device of claim 1 wherein the three or more light sensors include a light-to-voltage sensor for characterizing the target surface without the use of filters.

5. The device of claim 1 wherein each of the three or more light sensors has a planar locating surface that mates with a surface about a corresponding one of the alignment holes of the sensor locating element, thereby aligning a plane of the target surface and a plane of the sensors.

6. The device of claim 1 wherein the sensor locating element is further configured with one or more crushable ribs proximate each alignment hole, thereby enabling maximum clamping pressure on each filter stack with minimum deformation of filter elements.

7. The device of claim 1 further comprising a lead frame PCB assembly configured with soldering points for electrically connecting the sensors, and alignment holes adapted to couple with alignment pins of the tube block, thereby further contributing to self-aligning qualities of the device.

8. The device of claim 1 further comprising a clamping block configured with three or more pressure bumps adapted to apply clamping pressure to the sensors during assembly of the device.

9. The device of claim 8 wherein during final assembly of the device, a clamping screw travels through at the clamping block and sensor locating element, and threads into a clamping screw hole in the tube block at a pre-defined torque.

10. The device of claim 8 wherein each sensor has a surface that includes an inward dimple that is adapted to receive a corresponding pressure bump of the clamping block, thereby further contributing to self-aligning qualities of the device.

11. The device of claim 1 further comprising a sensor shield adapted to prevent extraneous light from corrupting measurement accuracy.

12. A color sensing device for sensing light emitting from a target surface, the device comprising:
a tube block having one or more filter cavities and corresponding light passages, and two or more alignment pins, thereby enabling a self-aligning fabrication process for the device; one or more light sensors, each sensor configured with a bubble shaped lens and adapted to detect light from the target surface; and
a sensor locating element operatively coupled to the pins of the tube block, the sensor locating element having one or more lens alignment holes, each hole adapted to receive a corresponding one of the bubble shaped lenses, thereby aligning each sensor with a corresponding light passage of the tube block.

13. The device of claim 12 further comprising:
one or more light filters, each filter placed in a corresponding one of the filter cavities, thereby providing one or more spectrally selective channels, with each spectral channel designed to provide a pre-defined field of view between the target surface and a corresponding one of the light sensors.

14. The device of claim 13 wherein the sensor locating element is further configured with one or more crushable ribs proximate each alignment hole, thereby enabling maximum clamping pressure on each filter with minimum deformation of filter elements.

15. The device of claim 13 wherein the one or more spectral channels are non-overlapping, thereby enabling tri-stimulus measurements.

16. The device of claim 12 wherein the device has a field of view between each sensor and the target surface that simulates a human eye field of view.

17. The device of claim 12 wherein each of the one or more light sensors has a planar locating surface that mates with a surface about a corresponding one of the alignment holes of the sensor locating element, thereby aligning a plane of the target surface and a plane of the sensors.

18. The device of claim 12 further comprising a lead frame PCB assembly configured with soldering points for electrically connecting the sensors, and alignment holes adapted to couple with alignment pins of the tube block, thereby further contributing to self-aligning qualities of the device.

19. The device of claim 12 wherein each sensor has a surface that includes an inward dimple, and the device further comprises a clamping block configured with one or more pressure bumps, each bump adapted to engage a corresponding dimple, thereby further contributing to self-aligning qualities of the device.

* * * * *

UNITED STATES PATENT AND TRADEMARK OFFICE
CERTIFICATE OF CORRECTION

PATENT NO. : 7,030,987 B2  
APPLICATION NO. : 10/684864  
DATED : April 18, 2006  
INVENTOR(S) : Carl David Lutz and Thomas A. Lianza Page 1 of 1

It is certified that error appears in the above-identified patent and that said Letters Patent is hereby corrected as shown below:

Column 1,  
Line 16, delete "calorimeter", insert --colorimeter--  
Line 17, delete "calorimeter", insert --colorimeter--  
Line 45, delete "calorimeter", insert --colorimeter--

Column 2,  
Line 9, delete "calorimeter", insert --colorimeter--  
Line 12, delete "calorimeter", insert --colorimeter--

Column 4,  
Line 35, delete "calorimeter", insert --colorimeter--  
Line 41, delete "calorimeter", insert --colorimeter--  
Line 56, delete "calorimeter", insert --colorimeter--

Column 5,  
Line 4, delete "calorimeter", insert --colorimeter--  
Line 29, delete "calorimeter", insert --colorimeter--  
Line 44, delete "calorimeter", insert --colorimeter--

Column 8,  
Line 55, delete "calorimeter", insert --colorimeter--

Column 9,  
Line 17, delete "calorimeter", insert --colorimeter--

Column 10  
Line 18, delete "calorimeter", insert --colorimeter--

Signed and Sealed this

Nineteenth Day of December, 2006

JON W. DUDAS  
*Director of the United States Patent and Trademark Office*